(12) United States Patent
Varerkar et al.

(10) Patent No.: US 9,900,685 B2
(45) Date of Patent: Feb. 20, 2018

(54) CREATING AN AUDIO ENVELOPE BASED ON ANGULAR INFORMATION

(71) Applicant: Intel Corporation, Santa Clara, CA (US)

(72) Inventors: Mayuresh M. Varerkar, Folsom, CA (US); Stanley J. Baran, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/079,621

(22) Filed: Mar. 24, 2016

(65) Prior Publication Data
US 2017/0280235 A1 Sep. 28, 2017

(51) Int. Cl.
*H04R 1/40* (2006.01)
*G10L 17/06* (2013.01)
*G10L 15/02* (2006.01)
*H04R 3/04* (2006.01)

(52) U.S. Cl.
CPC ............. *H04R 1/406* (2013.01); *G10L 15/02* (2013.01); *G10L 17/06* (2013.01); *H04R 3/04* (2013.01)

(58) Field of Classification Search
CPC .. H04S 7/303; H04S 2420/01; H04S 2400/01; H04R 2201/403; H04R 3/005; G10L 21/0272; G10L 2015/233; G10L 2021/02166
USPC .............................. 381/92, 26, 309; 704/233
See application file for complete search history.

(56) References Cited

U.S. PATENT DOCUMENTS

| | | | | |
|---|---|---|---|---|
| 9,076,450 | B1* | 7/2015 | Sadek | G10L 15/34 |
| 2004/0037436 | A1* | 2/2004 | Rui | H04R 3/005 |
| | | | | 381/92 |
| 2013/0129113 | A1* | 5/2013 | Jeong | G01S 5/20 |
| | | | | 381/92 |
| 2015/0058003 | A1* | 2/2015 | Mohideen | G10L 15/20 |
| | | | | 704/233 |
| 2015/0301796 | A1* | 10/2015 | Visser | G06F 3/167 |
| | | | | 715/728 |
| 2016/0019026 | A1* | 1/2016 | Gupta | G06F 3/167 |
| | | | | 704/233 |
| 2016/0057385 | A1* | 2/2016 | Burenius | H04N 7/15 |
| | | | | 348/14.16 |

OTHER PUBLICATIONS

HP Labs (https://www.youtube.com/watch?v=BTgxTcZjNnk), Date viewed Jun. 29, 2016.

(Continued)

*Primary Examiner* — Melur Ramakrishnaiah
(74) *Attorney, Agent, or Firm* — International IP Law Group, P.L.L.C.

(57) ABSTRACT

An apparatus for enabling an audio envelope based on angular information is described herein. The apparatus includes one or more microphones to receive audio signals and a beamformer to determine arrival time coefficients. The apparatus also includes a distance detector to determine a distance of a speech source from the one or more microphones based on the arrival time coefficients, and an angular locator to determine the angular information of the speech sources. Moreover, the apparatus includes a processor to create an audio envelope based on the distance and angular location of the speech source.

25 Claims, 7 Drawing Sheets

(56) References Cited

OTHER PUBLICATIONS

Ajmera et al., Clustering and Segmenting Speakers and their Locations in Meetings, IDIAP Research Report/Dalle Molle Institute for Perceptual Artificial Intelligence, Dec. 2003, Switzerland, 10 pages.

Lathoud et al., Location Based Speaker Segmentation, IDIAP Research Report/Dalle Molle Institute for Perceptual Artificial Intelligence, Oct. 2002, Switzerland, 10 pages.

Stokes et al., Speaker Identification Using a Microphone Array and Joint HMM With Speech Spectrum and Angle of Arrival, Microsoft Research, Date Viewed: Apr. 20, 2016, Redmond, CA, 4 pages.

* cited by examiner

CREATING AN AUDIO ENVELOPE BASED ON ANGULAR INFORMATION

BACKGROUND ART

Beamforming may be used to focus on retrieving data from a particular speech source, such as a person speaking. To enable beamforming, directionality of a microphone array is controlled by receiving audio signals from individual microphones of the microphone array and processing the audio signals in such a way as to amplify certain components of the audio signal based on the relative position of the corresponding sound source to the microphone array. For example, the directionality of the microphone array can be adjusted by shifting the phase of the received audio signals and then adding the audio signals together.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
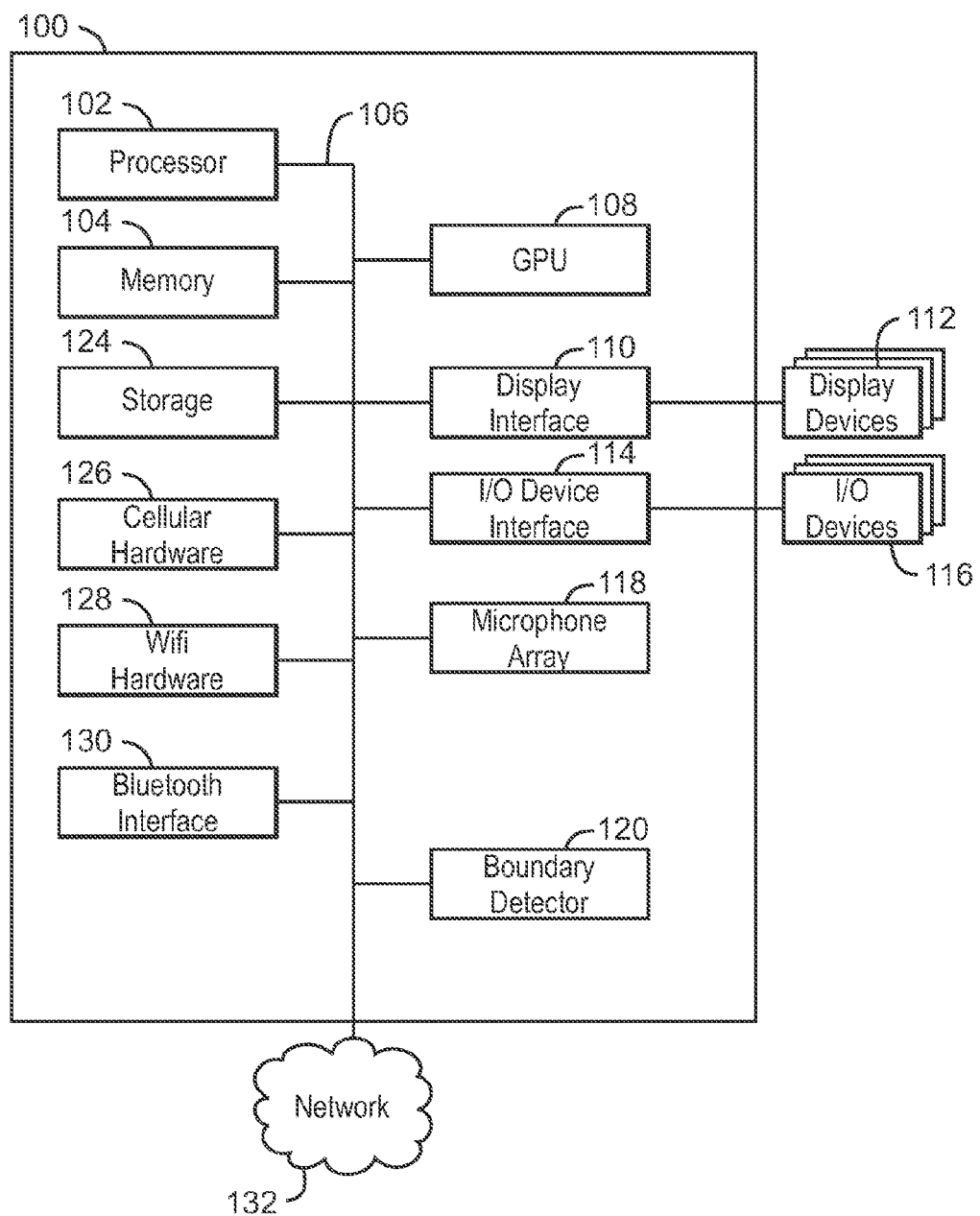
FIG. 1 is a block diagram of an electronic device that enables an audio envelope based on angular information.

Humans are able to identify, distinguish and separate speech sources even when there are multiple people speaking, but, computer based automated speech recognition and processing engines are not capable working with more than one speaker (person) at a time. Thus it is important to create an envelope or boundary that helps distinguish and separate one speech source from other. Typical environments include multiple users and important speech usages such as automatic speech recognition for speech to text and usage by multiple agents and assistants.

Embodiments described herein enable an audio envelope based on angular information. A plurality of microphones may receive audio signals and a beamformer to determine arrival time coefficients. A distance of a speech source from the one or more microphones may be determined based on the arrival time coefficients, and the angular location of the speech sources may also be determined. An audio envelope may be created based on the distance and angular location of the speech source.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enables an audio envelope based on angular information. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data. The video data may be used to control audio beamforming.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a microphone array 118 for capturing audio. The microphone array 118 can include any number of microphones. In some embodiments, the microphone array 118 can be used together with an angular information and triangulated distances to identify multiple users/speakers as well as changes in the user/speaker. An envelope may be created based on the location of the speaker. As used herein, an envelope in case of speech usages indicates a set/collection of relevant audio data from an audio stream. For example, the envelope may be a boundary or a signal which would help the speech application identify transition from one user's speech to the other or in some cases can distinguish a user's speech from some other sound source present at the same time (could be noise or could be another user's voice). The electronic device 100 also includes a boundary detector 120. The boundary detector is to create an envelope that distinguishes multiple sources from other sound sources. In embodiments, a process or application may track an audio segment from beginning to end, monitoring the angular information to maintain a current envelope.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

The present techniques correct the error that is introduced when multiple speakers are speaking or when a single speaker is speaking in a noisy environment. The distance and angular information can be derived by correlating arrival time coefficients between microphones to determine angular and triangulated distance information with respect to a microphone array. The angular information and the triangulated distance information are used to identify the origin of sounds captured by the microphone array. A beamformer may be dynamically steered based on the location of the sound source or sound sources.

Beamforming may be accomplished using differing algorithms and techniques. Each beamforming algorithm is to enable directional signal transmission or reception by combining elements in an array in a way where signals at particular angles experience constructive interference and while others experience destructive interference. A beamformer may be a system that performs spatial signal processing with an array of transmitters or receivers. During beamforming as described herein, an angle from each speech source is calculated. Thus, calculating angular information is a task typical of many beamforming applications. In embodiments, the angular information can be obtained from a beamforming application without any further calculations. Additionally, in embodiments, angular information can be calculated independently of a beamforming application. For example, the angular information may be calculated from each speech source based on microphone specific arrival time coefficients.

Generally, in a beamforming implementation where angular information is obtained from the beamformer, a spatial filter may process incoming audio signals that arrive at each microphone of the microphone array at various times, based on the speech source's location with respect to each microphone. Each time delay may be applied to each audio signal at each microphone to compensate for different arrival times. The arrival time coefficients, as used herein, are coefficients applied to each audio signal to compensate for varying arrival times of an audio signal as described above.

Figure 2:
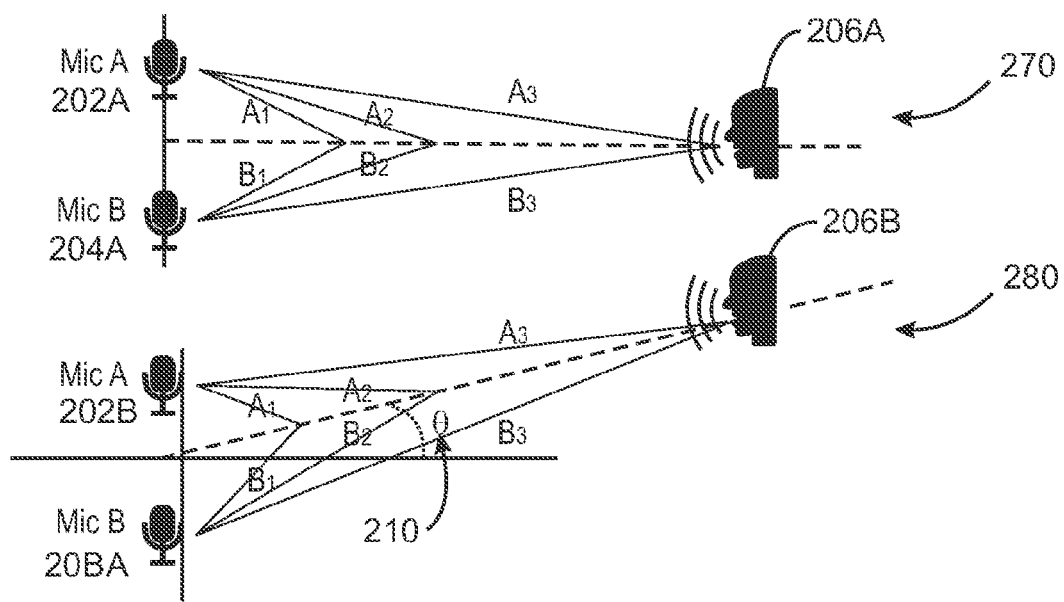
FIG. 2 is an illustration of an environment where an audio envelope based on angular information is enabled.

FIG. 2 is an illustration of an environment 200 where an audio envelope based on angular information is enabled. The environment 200 includes a microphone array including dual microphones 202A and 204A capturing audio from a speech source 206. The environment 200 also includes a microphone array including dual microphones 202B and 204B capturing audio from a speech source 206B. Each microphone array may be a microphone array 118 of an electronic device 100 (FIG. 1).

The microphone array including dual microphones 202A and 204A includes speech source 206A at reference number 270. Similarly, the microphone array including dual microphones 202B and 204B includes speech source 206B at reference number 280. At reference number 280, sound generally arrives microphone 202B before microphone 204B. Each line $A_n$, $B_n$ is used to represent the position of the sound source. For example, the intersection of A1/B1; A2/B2, and A3/B3 are three discrete points which could mark the position of the sound source 206A or 206B. An angle $\theta$ 210, is defined to be the angle from the center of the microphone array as shown to the line intersecting the sound source. Though the distance from the microphone array varies, the angle $\theta$ with respect to the microphone array remains constant for all those points on the dotted line. The angle $\theta$ may change as the location of the speech source changes with respect to the microphone array. As used herein, angular information includes angles calculated between a microphone and a speaker that can be used to determine a location of the speaker. In embodiments, a change in angular or location information that is faster than a threshold the represents how fast the user can be reasonably expected to move can indicate a change in user/speaker.

For ease of description, a single angle for each of a single users is illustrated. However, a plurality of angles may be found for multiple audio sources. In embodiments, the number of angles is dependent upon the number of microphones present in the system. In embodiments, a correlation may be used between any pair of microphones in the array to detect the delay between the waveforms at each microphone and to compute the delta in distance to the source. The probable direction of the source with respect to the microphone array may also be determined.

This angular information can be used to create an envelope by tracking a plurality of audio streams and monitoring the angular information to maintain a current envelope. In some cases, time stamps indicating the beginning and ending of an audio stream can be observed in an audio stream or stored in a memory. The created envelope is maintained based on the angular information and/or the triangulated distances found by extracting information from a beamformer. When the change beyond a predetermined threshold, a new envelope may be created. In embodiments, markers or other indicators may be generated that indicate a captured audio signal is from a particular source. For example, an indicator may be a point in memory where the audio stream is stored or a time in the audio stream. The beginning and end of an audio segment may be monitored and the marker or other indicators may be time based or memory location based. While markers may be inserted into the audio stream, in another embodiment an application may keep track of the memory location for that audio stream or the beginning and end time stamp to create the envelope. If the determined angular information were to change beyond a threshold, another envelope may be created and monitored. In embodiments, the threshold may be, for example, a degree change in the angular information.

The present techniques enable computer based automated speech recognition and processing engines to distinguish and separate various speech sources. As noted above, humans are able to identify, distinguish and separate speech sources even when there are multiple people speaking, but computer based automated speech recognition and processing engines are typically not capable working with more than one speaker at a time. The envelope or boundary according to the present techniques assists in distinguishing and separating one speech source from other. The envelope or boundary represents identifiers in the audio stream of a speech source that are used to identify the speech source. In embodiments, the envelope indicates a set or collection of relevant audio data from an audio stream.

Typical environments include multiple users and important speech usages such as automatic speech recognition for speech to text and usage by multiple agents and assistants as well as speaker identification for security, privacy and for enhancing diarisation. While only a single speech source is included in FIG. 2 for ease of description, people typically communicate with multiple speakers when interacting with other humans. For example, a first person may be speaking and a second person may begin speaking right after the first person has ended speaking, which causes an abrupt transition, sometimes even with overlap with the first speaker. Additionally, two or more speakers may speak simultaneously, perhaps to different individuals in the room.

Multiple speakers may cause potential issues for a computer or speech application. In the case of multiple speakers with minimal or no overlap in speaking, various inaccuracies occur, such as speech commands not being detected or being detected incorrectly. Moreover, user identity based on speech may be identified incorrectly, and words may be associated with the wrong user. In the case of multiple speakers with significant overlap in speaking, the above inaccuracies of speech commands not being detected or being detected incorrectly may be worse when compared with multiple speakers with little to no overlap in speaking.

The present techniques enable more accurate detection of speech commands and accurate detection of user identity in the case of multiple speakers with minimal or no overlap in speaking. Moreover, the present techniques enable speech data to be better applied to the correct speaker. Additionally, in the case of multiple speakers with significant overlap in speaking, the present techniques can detect this situation and reject the audio data or provide a warning.

The present techniques utilize and extend existing environment noise reduction algorithms such as the portion of a dynamically steerable beam former with the function that correlates arrival time coefficients between microphones to determine angular and triangulated distance information with respect to a microphone array to identify sound origin. These angular information and triangulated distances can be used to identify if there are multiple users/speakers in the same room. The angular information and triangulated distances can also be used to identify changes in the user/speaker by detecting large changes in angular or location information. In embodiments, a change in angular or location information that is faster than a threshold the represents how fast the user can be reasonably expected to move can indicate a change in user/speaker. After the angular or location information of the speaker or speakers is determined, the angular or location information can be used to create an envelope of audio data to feed speech engines for several usages. An envelope in case of speech usages indicates a set or collection of relevant audio data from an audio stream from a specific source. For example, the envelope may be a boundary or a signal which would help the speech application identify transition from one user's speech to the other or in some cases can distinguish a user's speech from some other sound source present at the same time. Thus, the envelope may be noise or could be another user's voice.

In embodiments, the angular information used to create the envelope as described herein may be obtained from a variety of sources or calculated independently. These algorithms provide a filter to remove noise from the environment based on characteristics of speech as opposed to direction, similar to beamforming. In embodiments, Blind Source Separation (BSS) algorithms may be used to separate multiple audio stream to provide an envelope or change detection based on knowledge of individual speaker (human) characteristics. The BSS algorithms may also provide for simultaneous separation into multiple audio streams that can be processed separately in addition to defining envelopes for each speech source. The use of BSS algorithms may result in added functionality to solve for cases where multiple people are speaking at the same time.

For example, sound localization techniques such as MUSIC, ESPRIT, blind source separation, and the like may be used to determine a location or direction of sound. Blind source separation (BSS) technologies may also be used to clean an audio signal of unwanted voices or noises. The multi-channel audio data may also be separated using blind source separation. Noise cancellation may be performed when one or more channels are selected from the multi-channel audio data after blind source separation has been performed. In addition, auto echo cancellation may also be performed on the one or more selected channels.

Figure 3:
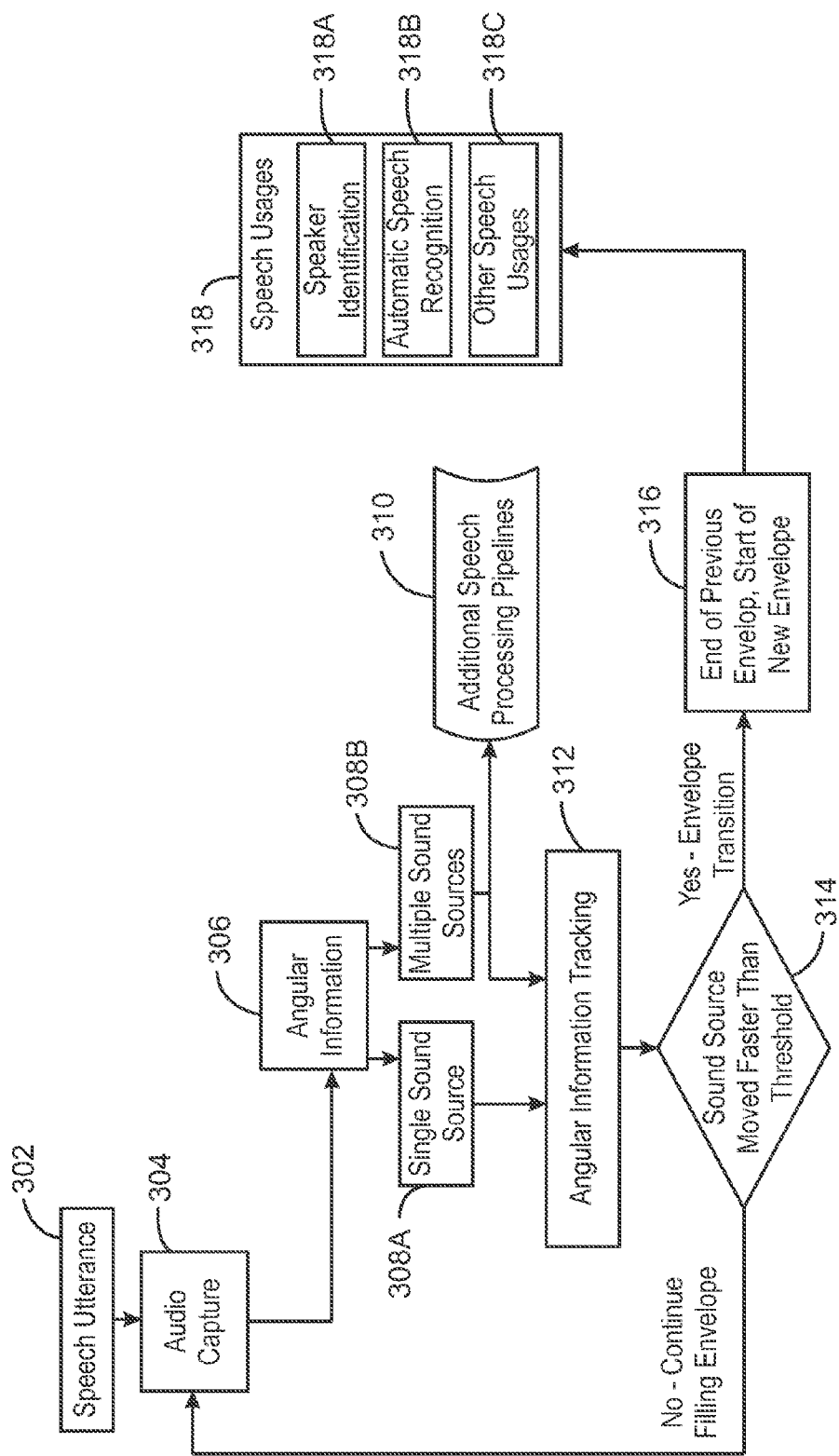
FIG. 3 is a process flow diagram of a method that obtains angular information to create an audio envelope.

FIG. 3 is a process flow diagram of a method 300 that obtains angular information to create an audio envelope. As discussed above, an audio envelop may be created by using angular information to create markers or identifiers in an audio stream, and associating the audio data between markers to a sound source. This envelop or data associated to a particular sound source may be used to identify the sound source, whether the sound is human speech or not, the identity of the speaker, and the like. Additionally, markers or other indicators may be generated that indicate a captured audio signal is from a particular source. The beginning and end of an audio segment may be monitored and the marker or other indicators may be time based or memory location based. The marker or other indicators may be used in various speech usages as described below.

At block 302, a speech utterance occurs. At 304, audio, such as the speech utterance, is captured. At block 306, angular information is obtained. As discussed above, the angular information may be obtained from beamforming algorithms or any other sound localization techniques. The angular information may also be independently calculated, without the use of other sound steering or sound localization techniques. Algorithms such as those which are internal to beam forming algorithms use a correlation of arrival time coefficients to create angular or location information for sound sources. Typically this information is not exposed and is only used to create a beam. In beamforming, approximately n+1 microphones are used to identify n different sound sources (assuming optimal microphone configuration).

At block 308A, the angular information is used to determine a location of a single sound source. Similarly, at block 308B, the angular information is used to determine a location of multiple sound sources. In the case of multiple sound sources, additional speech processing pipelines may be created at block 310 so that each speech source can be separately processed. In embodiments, blind source separation may be used to separate the audio from multiple sound sources to create additional speech processing pipelines. Accordingly, if multiple sound sources are detected, and their audio information can be separated through methods such as blind source separation, multiple distinct speech recognition or speaker identification pipelines can be created to identify all commands/speakers separately. If the information cannot be separated, the fact that there are a plurality of speakers can be used to avoid negative results such as false positives identification in the case of speaker identification (SI), or incorrect speech command in the case of automatic speech recognition (ASR).

At block 312, angular information tracking is performed. Angular information tracking includes polling the angular information to ensure that the angular information remains within the envelope created for each tracked sound source. At block 314, it is determined if the sound source has moved faster than a threshold. Angular direction and location information are used to track a sound source for a human speaker. If the source has moved at a faster rate than what is typical for a person, it is an indication that a new person is now speaking. In embodiments, the threshold is an approximation of human movement under the present circumstances. For example, if the angular information tracking indicates that the sound source has moved 15 feet in half of a second, such a movement may be greater than a threshold. In embodiments, the physical boundary/distance is determined by the angular coefficients calculated from different sound sources. A change in distance may correspond to change in angle which can be used to create an envelope if the angle changes quicker than a user could move. Accordingly, the threshold may also be a number of degrees, which then the change angular information exceeds this threshold number of degrees, it is determined that the sound source has moved faster than a human moves.

If the sound source has not moved greater than a threshold, the process flow returns to block 304 where audio capture continues using the present angular information calculations. If the sound source has moved greater than a threshold, process flow continues to block 316. At block 316, the previous envelope ends and a new envelope starts based on the new angular information. Data from the current envelope may be processed at block 318. At block 318, the captured audio may be used in various speech usages. For example, speaker identification 318A, automatic speech recognition 318B, or other speech usages 318C can be applied to the captured audio data. The angular information is continually monitored or tracked at reference number 312, such that when the sound source has moved quicker than the threshold, a new envelope is formed. The continual tracking of audio data may be performed in parallel with any number of tasks, including processing the data within the current envelope for various speech usages 318.

Figure 4:
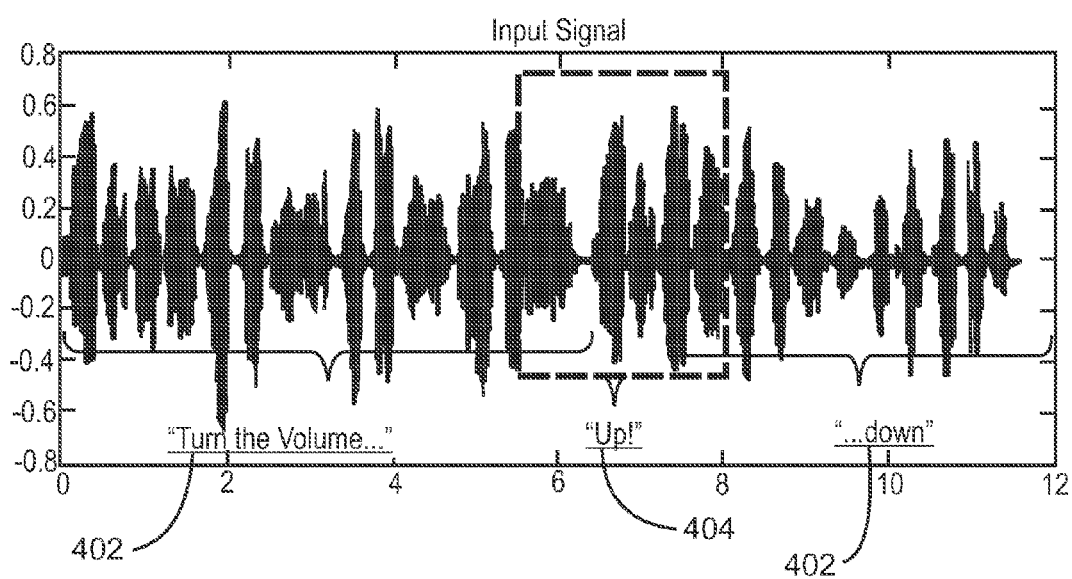
FIG. 4 is an exemplary waveform.

FIG. 4 is an exemplary waveform 400. The waveform includes speech from a speech source 402 and a speech source 404. In the waveform 400, the speech source 402 utters "Turn the volume down." This utterance is broken by the speech source 404 uttering "up" prior to the speech source 402 uttering "down." The present techniques use angular information to distinguish between the speech source 402 and the speech source 404. This command results in the volume being turned down, as a computing system processing the commands can distinguish between the two users. In embodiments, the "up" command by speech source 404 can be detected as a sound source with a different angle or location. Additionally, in embodiments, the "up" command by speech source 404 can be excluded or ignored, as it does not include any marker or other indicator that it originated from the speech source 402.

Figure 5:
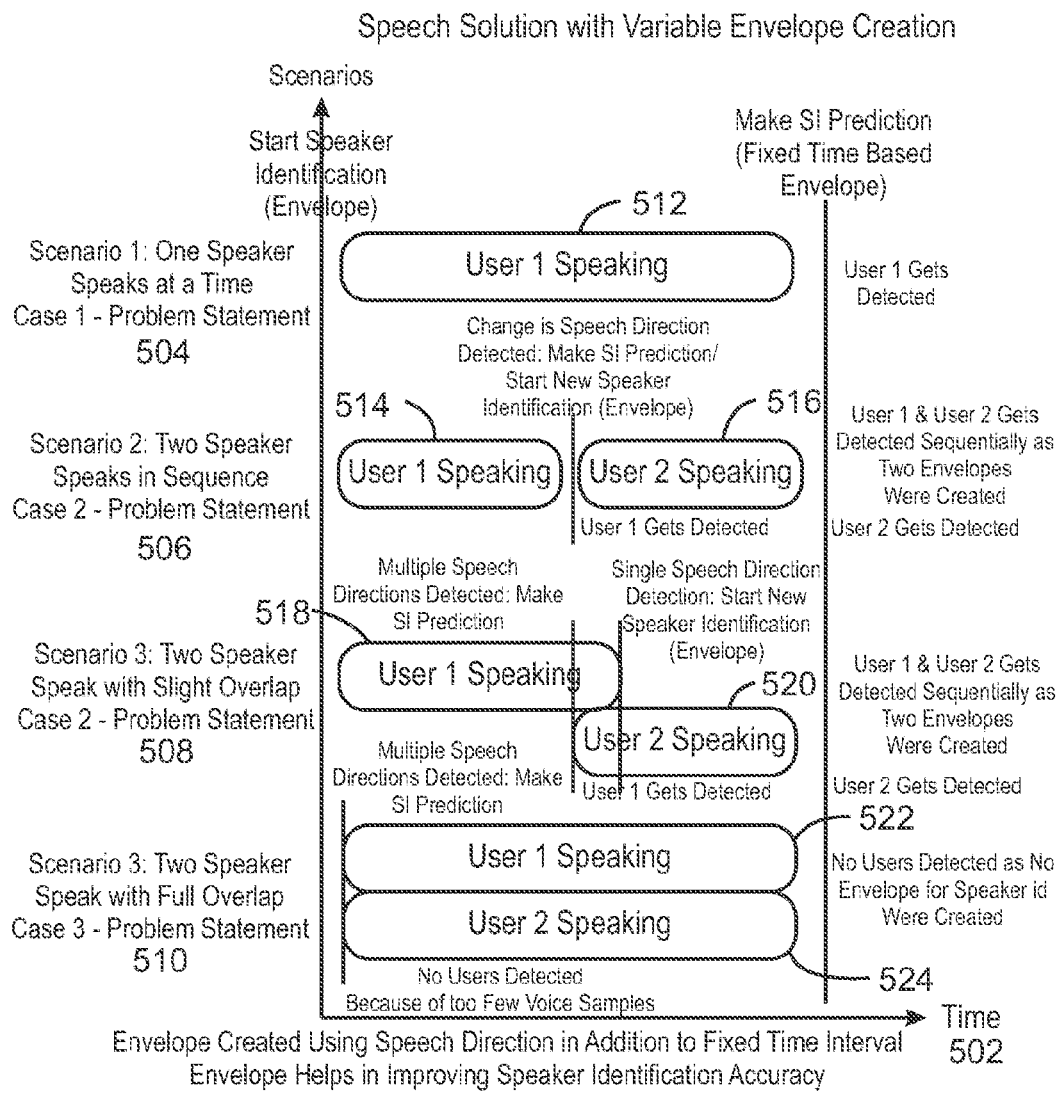
FIG. 5 is an example of a speech solution with variable envelope creation.

FIG. 5 is an example of a speech solution with variable envelope creation. In FIG. 5, various scenarios are analyzed with respect to time 502. Thus, the x-axis signifies time 502, and the y-axis signifies different scenarios. This solution uses a variable envelope creation approach according to the present techniques.

Four scenarios are illustrated, including scenario 504, scenario 506, scenario 508, and scenario 510. In each scenario, a prediction is to be made regarding which user is speaking based on one or more audio envelopes. In scenario 504, a single user 1 is speaking at reference number 512 between the time the speaker identification process starts until the time a prediction is made. Assuming that the speaker identification has high accuracy, user 1 is easily detected. In scenario 506, two speakers, user 1 and user 2, speak as indicated by reference numbers 514 and 516. The speech 514 and 516 occurs sequentially in the fixed time period between starting speaker identification and making a prediction. The direction/location information of the speaker can be used to identify when the speaker is switching. Multiple audio envelopes are created, and audio data in each envelope can be used to make a prediction. Each switch in speaker can be used to create a new envelope and separate predictions can be made to obtain better accuracy compared to a case where a prediction is made based on a fixed time interval with mixed/multiple speaker data. While user 1 is the first user detected, user 2 may be detected immediately after speech from user 1 ends.

At scenario 508, speech 518 from a user 1 overlaps with speech 520 from a second user. Using the direction information, multiple user's speech can be detected and prediction can be made on the envelope. The audio data with multiple voices can be rejected or the users can be indicated to speak one at a time for better results. Once User 2 is the only user speaking another audio envelope can be created and a new prediction can be made which has a better chance of getting accurate result. Again, user 1 is the first user detected, and user 2 may be detected once the overlap in speech with user 1 ends.

Scenario 510 is a complete overlap in speech 522 from a user 1 with speech 524 from a second user. Here, two speakers talk simultaneously over each other for the duration, beginning with when speaker identification starts until a prediction is made or where separate conversations are happening in the room. Humans have the capability to separate unwanted speech and concentrate on interpreting voice coming from a certain source, however computers lack this capability. The present techniques enable the use of direction information to identify a particular speaker for the processing of speech. In this case, the data can also be rejected or a warning signal can be displayed to ask the users to speak sequentially for better accuracy of the speech application. Additionally, in embodiments, both the users' speech may be separated using BSS or a beamformer can be used to attenuate speech coming from one non desired direction. In this manner, the other user can be identified.

Figure 6:
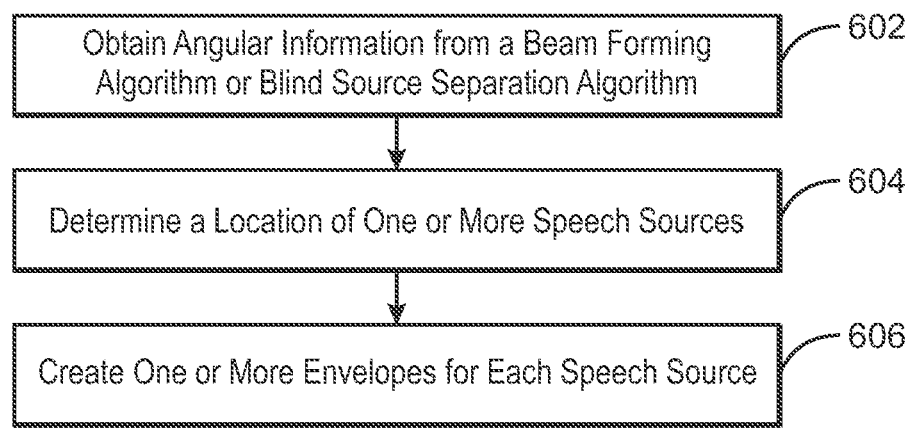
FIG. 6 is a process flow diagram of a method for enabling an audio envelope based on angular information.

FIG. 6 is a process flow diagram of a method 600 for enabling an audio envelope based on angular information. At block 602, angular information is obtained from a beamforming algorithm. In embodiments, the angular information may be independently calculated. At block 604, a location of one or more speech sources is determined based on the angular information. At block 606, one or more envelopes are created for each speech source. In this manner, each speech source can be monitored within their respective envelope. When movement of the speech source occurs, the movement can be compared to a threshold. If the new location of the speech source is greater than the threshold, a new envelope can be created.

The present techniques result in improved and more deterministic results for speech usages and enhance the user experience. The present techniques also result in more accurate angular/location information from speech when compared with existing algorithms. Additionally, the present techniques enhance the accuracy of speech applications in ideal circumstances, where a single user is talking at a time with significant pause before/after speech. When sounds occur at different times (e.g. speaking while taking turns) each user may be detected with a switch in sound source (e.g. angle changing faster than a threshold). When sounds occur at the same time, if sound source separation is possible, a plurality of different identify/recognition pipelines and envelopes may be created. If the sounds that occur at the same time cannot be separated, the audio data may be rejected since any identify/recognition process will be error prone. Additionally, if the sounds that occur at the same time cannot be separated, an indication may be provided to the application and/or user that the sound sources cannot be separated and that any identify/recognition will be error prone. The indication may be, for example, an error message sent to a user, setting error bit in a stream of data sent to an application, flagging data with an error flag sent to an application, a warning tone emitted to a user, and the like.

Figure 7:
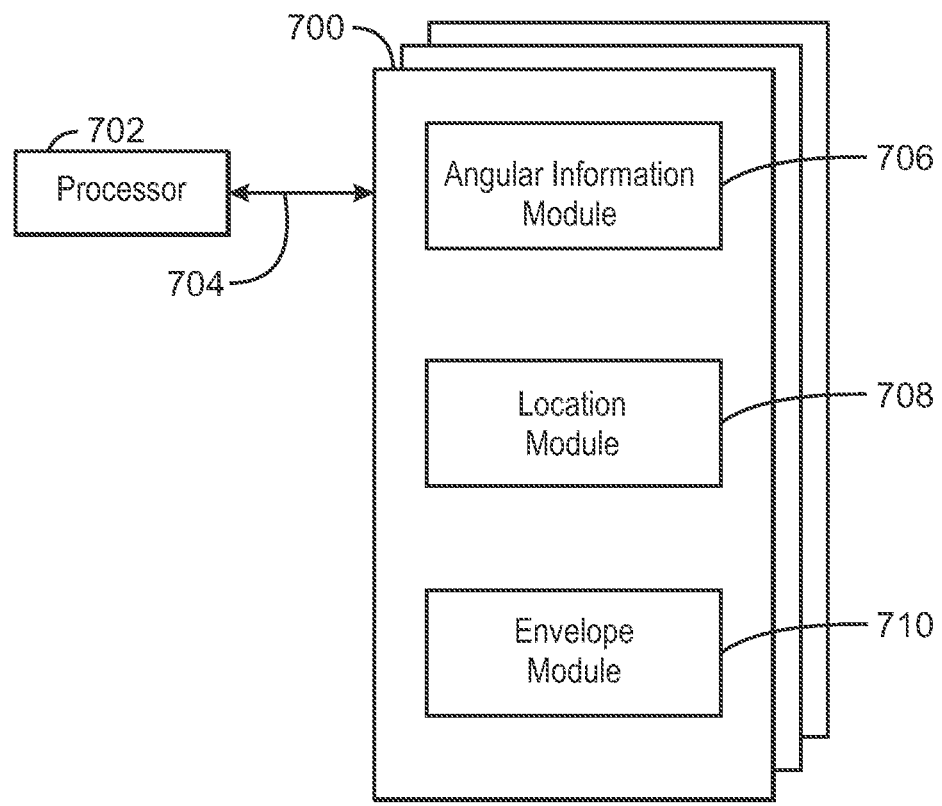
FIG. 7 is a block diagram showing a medium that contains logic for enabling an audio envelope based on angular information.

FIG. 7 is a block diagram showing a medium 700 that contains logic for enabling an audio envelope based on angular information. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-710 configured to perform the techniques described herein. For example, an angular information module 706 may be configured to obtain angular information. A location module 708 may be configured to determine a location of a plurality of sources based on the angular information. An envelope module 710 may be configured to create an envelope for each speech source. In some embodiments, the modules 706-710 may be modules of computer code configured to direct the operations of the processor 702.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Example 1 is an apparatus. The apparatus includes one or more microphones to receive a plurality of audio signals; a beamformer to determine arrival time coefficients; a distance detector to determine a distance of a speech source from the one or more microphones based on the arrival time coefficients; an angular locator to determine an angular information of the speech source; and a processor to create an audio envelope based on the distance and angular information of the speech source.

Example 2 includes the apparatus of example 1, including or excluding optional features. In this example, the angular information and distance information is used to track the speech source.

Example 3 includes the apparatus of any one of examples 1 to 2, including or excluding optional features. In this example, a new speech source is found when the distance detector determines the speech source has moved greater than a threshold. Optionally, the threshold is a distance that the speech source has moved. Optionally, the threshold is an amount of degrees that the angular information has changed.

Example 4 includes the apparatus of any one of examples 1 to 3, including or excluding optional features. In this example, a plurality of speech sources generate the plurality of audio signals, and in response to separating the audio signals create a plurality of speaker identification pipelines are created. Optionally, the angular information and distance information is determined for each of the speaker identification pipelines. Optionally, the angular information and distance information is compared to a threshold to determine if a new envelope is to be created.

Example 5 includes the apparatus of any one of examples 1 to 4, including or excluding optional features. In this example, a plurality of speech sources generate the plurality of audio signals, and in response to not separating the audio signals, the audio signals are rejected. Optionally, the apparatus includes indicating to a user or application that speech source identification is error prone.

Example 6 includes the apparatus of any one of examples 1 to 5, including or excluding optional features. In this example, a new threshold is created when angular information and distance information is greater than a threshold.

Example 7 includes the apparatus of any one of examples 1 to 6, including or excluding optional features. In this example, a speaker identification process is to process speech from a speech source until a prediction occurs.

Example 8 is a method. The method includes obtaining angular information of a plurality of audio signals; determining a location of one or more speech sources that generate the plurality of audio signals; and creating an envelope for each speech source of the one or more speech sources.

Example 9 includes the method of example 8, including or excluding optional features. In this example, the angular information is obtained via arrival time coefficients are obtained from a beamformer.

Example 10 includes the method of any one of examples 8 to 9, including or excluding optional features. In this example, the angular information is based on arrival time coefficients for each microphone of a plurality of microphones.

Example 11 includes the method of any one of examples 8 to 10, including or excluding optional features. In this example, the angular information is used to track each speech source.

Example 12 includes the method of any one of examples 8 to 11, including or excluding optional features. In this example, the plurality of audio signals are separated via blind source separation.

Example 13 includes the method of any one of examples 8 to 12, including or excluding optional features. In this example, in response to the plurality of audio signals not being separated, rejecting the audio signals for envelope creation. Optionally, an indicator is provided to a user or application that speech source identification is error prone.

Example 14 includes the method of any one of examples 8 to 13, including or excluding optional features. In this example, multiple speech sources are detected, a plurality of speaker identification pipelines are created. Optionally, angular information and distance information is determined for each of the speaker identification pipelines.

Example 15 includes the method of any one of examples 8 to 14, including or excluding optional features. In this example, the angular information and distance information is compared to a threshold to determine if a new envelope is to be created.

Example 16 includes the method of any one of examples 8 to 15, including or excluding optional features. In this example, a new threshold is created when angular information and distance information is greater than a threshold.

Example 17 includes the method of any one of examples 8 to 16, including or excluding optional features. In this example, the speaker identification process is to process speech from a speech source until a prediction occurs.

Example 18 is a system. The system includes a plurality of microphones to capture audio data from a plurality of audio sources; a memory configured to receive audio data; and a processor coupled to the memory and microphones, the processor to: determine a distance of each audio source from the one or more microphones; determine angular information of each of the plurality of audio sources; identify a command from an audio source of the plurality of audio sources; and create an audio envelope based on the distance and angular information of the identified audio source.

Example 19 includes the system of example 18, including or excluding optional features. In this example, the angular information and distance information is used to track the identified audio source.

Example 20 includes the system of any one of examples 18 to 19, including or excluding optional features. In this example, system of claim 25, the envelope is created by injecting a marker or indicator onto the audio data from the identified audio source.

Example 21 includes the system of any one of examples 18 to 20, including or excluding optional features. In this example, a new audio source is found when the processor determines the identified audio source has moved greater than a threshold. Optionally, the threshold is a distance that the audio source has moved. Optionally, the threshold is an amount of degrees that the angular information has changed.

Example 22 includes the system of any one of examples 18 to 21, including or excluding optional features. In this example, in response to separating the audio data, a plurality of speaker identification pipelines are created. Optionally, in response to not separating the audio data, the audio data is rejected. Optionally, the system includes indicating to a user or application that audio source identification is error prone.

Example 23 is an apparatus. The apparatus includes one or more microphones to receive a plurality of audio signals; a beamformer to determine arrival time coefficients; a distance detector to determine a distance of a speech source from the one or more microphones based on the arrival time coefficients; a means to determine an angular information of the speech source; and a means an audio envelope based on the distance and angular information of the speech source.

Example 24 includes the apparatus of example 23, including or excluding optional features. In this example, the angular information and distance information is used to track the speech source.

Example 25 includes the apparatus of any one of examples 23 to 24, including or excluding optional features. In this example, a new speech source is found when the distance detector determines the speech source has moved greater than a threshold.

Example 26 includes the apparatus of any one of examples 23 to 25, including or excluding optional features. In this example, the threshold is a distance that the speech source has moved.

Example 27 includes the apparatus of any one of examples 23 to 26, including or excluding optional features. In this example, the threshold is an amount of degrees that the angular information has changed.

Example 28 includes the apparatus of any one of examples 23 to 27, including or excluding optional features. In this example, a plurality of speech sources generate the plurality of audio signals, and in response to separating the audio signals create a plurality of speaker identification pipelines are created. Optionally, the angular information and distance information is determined for each of the speaker identification pipelines. Optionally, the angular information and distance information is compared to a threshold to determine if a new envelope is to be created.

Example 29 includes the apparatus of any one of examples 23 to 28, including or excluding optional features. In this example, a plurality of speech sources generate the plurality of audio signals, and in response to not separating the audio signals, the audio signals are rejected. Optionally, the apparatus includes indicating to a user or application that speech source identification is error prone.

Example 30 includes the apparatus of any one of examples 23 to 29, including or excluding optional features. In this example, a new threshold is created when angular information and distance information is greater than a threshold.

Example 31 includes the apparatus of any one of examples 23 to 30, including or excluding optional features. In this example, a speaker identification process is to process speech from a speech source until a prediction occurs.

Example 32 is at least one machine readable medium comprising a plurality of instructions that. The computer-readable medium includes instructions that direct the processor to obtain angular information of a plurality of audio signals; determine a location of one or more speech sources that generate the plurality of audio signals; and create an envelope for each speech source of the one or more speech sources.

Example 33 includes the computer-readable medium of example 32, including or excluding optional features. In this example, the angular information is obtained via arrival time coefficients are obtained from a beamformer.

Example 34 includes the computer-readable medium of any one of examples 32 to 33, including or excluding optional features. In this example, the angular information is based on arrival time coefficients for each microphone of a plurality of microphones.

Example 35 includes the computer-readable medium of any one of examples 32 to 34, including or excluding optional features. In this example, the angular information is used to track each speech source.

Example 36 includes the computer-readable medium of any one of examples 32 to 35, including or excluding optional features. In this example, the plurality of audio signals are separated via blind source separation.

Example 37 includes the computer-readable medium of any one of examples 32 to 36, including or excluding optional features. In this example, in response to the plurality of audio signals not being separated, rejecting the audio signals for envelope creation. Optionally, an indicator is provided to a user or application that speech source identification is error prone.

Example 38 includes the computer-readable medium of any one of examples 32 to 37, including or excluding optional features. In this example, multiple speech sources are detected, a plurality of speaker identification pipelines are created. Optionally, angular information and distance information is determined for each of the speaker identification pipelines.

Example 39 includes the computer-readable medium of any one of examples 32 to 38, including or excluding optional features. In this example, the angular information and distance information is compared to a threshold to determine if a new envelope is to be created.

Example 40 includes the computer-readable medium of any one of examples 32 to 39, including or excluding optional features. In this example, a new threshold is created when angular information and distance information is greater than a threshold.

Example 41 includes the computer-readable medium of any one of examples 32 to 40, including or excluding optional features. In this example, the speaker identification process is to process speech from a speech source until a prediction occurs.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:
1. A system, comprising:
a plurality of microphones to capture audio data from a plurality of audio sources;
a memory configured to receive audio data; and
a processor coupled to the memory and microphones, the processor to:

determine a distance of each audio source from the one or more microphones;
determine angular information of each of the plurality of audio sources;
identify a command from an audio source of the plurality of audio sources; and
create an audio envelope based on the distance and angular information of the identified audio source.

2. The system of claim 1, wherein the angular information and distance information is used to track the identified audio source.

3. The system of claim 1, the envelope is created by injecting a marker or indicator onto the audio data from the identified audio source.

4. The system of claim 1, wherein a new audio source is found when the processor determines the identified audio source has moved greater than a threshold.

5. The system of claim 1, wherein a new audio source is found when the processor determines the identified audio source has moved greater than a threshold and the threshold is a distance that the audio source has moved.

6. The system of claim 1, wherein a new audio source is found when the processor determines the identified audio source has moved greater than a threshold and the threshold is an amount of degrees that the angular information has changed.

7. The system of claim 1, wherein in response to separating the audio data, a plurality of speaker identification pipelines are created.

8. The system of claim 1, wherein in response to not separating the audio data, the audio data is rejected.

9. The system of claim 1, wherein in response to not separating the audio data, the audio data is rejected and an indication is provided to a user or application that audio source identification is error prone.

10. A method, comprising:
obtaining angular information for each audio signal of a plurality of audio signals;
determining a location of one or more speech sources that generate each audio signal of the plurality of audio signals; and
creating an envelope for each speech source of the one or more speech sources.

11. The method of claim 10, wherein the angular information is obtained via arrival time coefficients that are obtained from a beamformer.

12. The method of claim 10, wherein the angular information is based on arrival time coefficients for each microphone of a plurality of microphones.

13. The method of claim 10, wherein the angular information is used to track each speech source.

14. The method of claim 10, wherein the plurality of audio signals are separated via blind source separation.

15. An apparatus, comprising:
one or more microphones to receive a plurality of audio signals;
a beamformer to determine arrival time coefficients;
a distance detector to determine a distance of a speech source from the one or more microphones based on the arrival time coefficients;
an angular locator to determine an angular information of the speech source; and
a processor to create an audio envelope based on the distance and angular information of the speech source.

16. The apparatus of claim 15, wherein the angular information and distance information is used to track the speech source.

17. The apparatus of claim 15, wherein a new speech source is found when the distance detector determines the speech source has moved greater than a threshold.

18. The apparatus of claim 15, wherein a new speech source is found when the distance detector determines the speech source has moved greater than a threshold and the threshold is a distance that the speech source has moved.

19. The apparatus of claim 15, wherein a new speech source is found when the distance detector determines the speech source has moved greater than a threshold and the threshold is an amount of degrees that the angular information has changed.

20. The apparatus of claim 15, wherein a plurality of speech sources generate the plurality of audio signals, and in response to separating the audio signals a plurality of speaker identification pipelines are created.

21. The apparatus of claim 15, wherein a plurality of speech sources generate the plurality of audio signals, and in response to separating the audio signals a plurality of speaker identification pipelines are created and the angular information and distance information is determined for each of the speaker identification pipelines.

22. The apparatus of claim 15, wherein a plurality of speech sources generate the plurality of audio signals, and in response to separating the audio signals a plurality of speaker identification pipelines are created and the angular information and distance information is compared to a threshold to determine if a new envelope is to be created.

23. The apparatus of claim 15, wherein a plurality of speech sources generate the plurality of audio signals, and in response to not separating the audio signals, the audio signals are rejected.

24. At least one non-transitory machine readable medium comprising a plurality of instructions that, in response to being executed on a computing device, cause the computing device to:
obtain angular information of a plurality of audio signals, wherein angular information comprises an angle from each of one or more speech sources;
determine a location of the one or more speech sources that generate the plurality of audio signals; and
create an envelope for each speech source of the one or more speech sources.

25. The computer readable medium of claim 24, wherein the angular information is obtained via arrival time coefficients are obtained from a beamformer.

* * * * *